Patented Sept. 29, 1942

2,297,212

UNITED STATES PATENT OFFICE 2,297,212

STABLE VITAMIN C AND PROCESS FOR PREPARING THE SAME

Heinrich Gockel, Hohen Neuendorf, near Berlin, Germany; vested in the Alien Property Custodian No Drawing. Application February 6, 1939, Serial No. 254,941. In Germany February 10, 1938

13 Claims. (Cl. 99—11)

This invention pertains generally to the preservation of the vitamin content of food stuffs and pertains particularly to the preservation in food stuffs of vitamin C. The invention pertains more particularly to inhibiting the decomposition of ascorbic acid regardless of the form in which it may exist.

Vitamin C as it occurs naturally in food stuffs, such as fruits and vegetables, deteriorates very rapidly once the natural covering, such as the skin, is broken. This applies whether the food stuffs are cut or sliced or whether juices are expressed therefrom.

Both heat and exposure to air contribute to the decomposition of vitamin C. Accordingly, in the usual canning processes, substantial proportions of the original vitamin C content are lost.

Freshly prepared extracts or juices even if unheated lose very substantial proportions of their original vitamin C content within a period of hours or a few days.

While one of the first products of the alteration or decomposition of vitamin C is apparently dihydro-ascorbic acid, which in turn appears to serve the human or animal organism in somewhat the same way as vitamin C, further products of decomposition are for practicable purposes entirely useless for the purposes which vitamin C serves.

I have discovered that the addition of small amounts of thiourea of food stuffs generally including extracts and juices and whether solid or liquid, serves to greatly retard the decompositon of vitamin C so that naturally occurring vitamin C in these materials is preserved for a considerable length of time.

I have further discovered that the effectiveness of thiourea in the preservation of vitamin C may be substantially increased by maintaining the pH of the mixture below 7.0.

In many cases, such as in the case of juices from citrous fruits or tomatoes, the natural occurring acidity is frequently sufficient to maintain the pH at a desired value.

In other cases, such as with juices which are either neutral or alkaline, a sufficient quantity of a weak or dilute acid, preferably organic, may be added to reduce the pH below 7.0.

Examples of such acids are citric acid, tartaric acid, acetic acid, for instance, in the form of vinegar, and similar organic acids normally occurring in food stuffs. Naturally occurring fruit juices having a pH below 7.0 such as lemon juice and lime juice, are very effective for this purpose.

On the other hand, should materials such as sulfur dioxide or phosphoric acid be employed for preservative purposes, the pH is frequently sufficiently low to make the addition of an acid unnecessary.

I prefer to add thiourea simultaneously with or immediately after any step in the handling or processing of the food stuffs wherein its natural protection, such as its skin is broken. This is because vitamin C deterioration appears to begin as soon as the original food stuffs, or their extracts or juices are exposed to the atmosphere.

However, the thiourea may be added at any other time, for instance, to check the progress of deterioration of vitamin C already under way.

The following examples will serve to further illustrate my invention.

*Example 1*

A portion of freshly expressed lemon juice was analyzed and was found to contain 280 milligrams of vitamin C per liter.

This portion was divided into two samples.

To one of the samples was added a quantity of thiourea equivalent to 50 milligrams of thiourea per liter of juice.

No addition whatsoever was made to the other sample.

Both samples were stored at room temperature in closed flasks for a period of 4 weeks.

After the storage period, the first sample was found to contain 245 milligrams of vitamin C per liter of juice, whereas the other sample was found to contain only 32 milligrams of vitamin C per liter of juice.

*Example 2*

A portion of freshly prepared tomato juice was analyzed and was found to contain 143 milligrams of vitamin C per liter.

To one sample was added a quantity of a 5% thiourea solution in 10% acetc acid equivalent to 5 cc. of solution per liter of juice.

No addition whatsoever was made to another sample.

Both samples were stored at room temperature in closed flasks. At the end of six weeks the treated sample showed a vitamin C content equivalent to 131 milligrams per liter, whereas the untreated sample showed a vitamin C content equivalent to only 27 milligrams per liter.

After a period of four months the treated sample showed a vitamin C content equivalent to 124 milligrams per liter. The vitamin C content of the untreated sample was too small for determination and in all probability was much less than the equivalent of 10 milligrams per liter.

Example 3

A portion of freshly prepared potato juice was found to contain 120 milligrams of vitamin C per liter.

One sample of this juice was treated with a 5% thiourea solution in 10% acetic acid in amount equivalent to 10 cc, per liter of juice, and was then heated in a closed vessel for two hours at a temperature between 60 and 70° C.

Another sample having no addition of thiourea was similarly heated.

One effect of the heat treatment is the destruction of the oxydases which are known to exercise an influence on vitamin C.

After the heating the samples were permitted to cool and were stored at room temperature in closed containers.

At the end of 8 days the treated sample showed a vitamin C content of 115 milligrams per liter and at the end of 4 weeks the treated sample showed a vitamin C content of 105 milligrams per liter.

The untreated sample at the end of 24 hours showed only traces of vitamin C.

Example 4

One kilogram of finely chopped pine needles was divided into 4 equal parts.

One part was boiled for 10 minutes in one liter of water to which had been added 20 cc. of a 5% thiourea solution in 10% tartaric acid. The boiling was vigorous and a cover for the containing vessel was employed to aid in the exclusion of air.

The liquid was decanted and was successively employed in similarly treating the remaining three parts of chopped pine needles.

The final extract was found to contain 740 milligrams of vitamin C per liter. This extract was concentrated by evaporation of water under reduced pressure until it showed a concentration of vitamin C of 800 milligrams per liter.

The extract was then stored at room temperature in a closed container.

At the end of six months the extract was analyzed and was found to contain 650 milligrams of vitamin C per liter.

The above examples are typical of the results which I have obtained in applying my invention to food stuffs generally, the term food stuffs being employed, of course, to include not only naturally occurring and artificially prepared substances, but also to materials derived therefrom, such as extracts and juices.

Since the active principle in vitamin C has been found to be ascorbic acid, the following experiment was performed.

Example 5

To a solution of 10 milligrams of pure synthetic ascorbic acid in 100 cc. of water were added 5 milligrams of thiourea.

Several samples so prepared were kept at room temperature in closed containers.

At the end of three months each sample was analyzed and showed no substantial change in ascorbic acid content.

On the other hand, several samples of pure synthetic ascorbic acid stored in the same manner showed at the end of an 8 day period an ascorbic acid loss of 90%.

As previously pointed out, my invention may be applied to food stuffs in general for the purpose of preserving the vitamin C content thereof regardless of the form in which the food stuffs exist. For instance, the invention may be applied to whole fruits and vegetables such as to whole pears, whole peaches, whole tomatoes, peas, beans, etc., such as in canning or to any part thereof whether solid, semi-solid, liquid or otherwise.

The invention, in addition to being applicable to the preservation of the vitamin C content of materials derived from the plant kingdom such as oranges, lemons, grapefruit, raw and leafy vegetables, apples, tomatoes and carrots, their extracts and juices, may likewise be applied to the preservation of the vitamin C content of materials obtained in the animal kingdom, such as from the adrenal cortex, from pituitary glands, from thymus glands, the intestinal wall, as well as to ascorbic acid itself whether natural or synthetic.

Although I prefer to add thiourea or thiourea solutions as soon as the vitamin C or ascorbic acid is placed in an environment conducive to its decomposition such as when the natural protective coating of fruits and vegetables is ruptured, the invention may be applied to arrest or slow-up decomposition which is alread under way. In this connection dihydroascorbic acid appears to be preserved by my invention in much the same way as ascorbic acid itself.

Furthermore, I also prefer to apply my invention before the materials to be treated are subjected to prolonged cooking since untreated vitamin C is destroyed in this manner.

While I do not know how thiourea acts in the preservation of vitamin C or ascorbic acid, the following might be considered a possible explanation, which however is not to be regarded as limitative in character since by invention may be practiced and fully realized without a knowledge of the exact action of thiourea.

Thiourea may exist in at least two forms and also possibly in a third as follows:

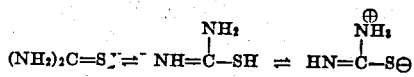

The tendency for thiourea to react in the —SH form is very pronounced, for instance, in oxidation reactions although the first form is also subject to oxidation.

It is at present thought that the destruction of vitamin C is associated with its oxidation by atmospheric oxygen or otherwise, and that when thiourea is present it is preferentially oxidized thus protecting the vitamin C.

On the other hand, the reducing action of thiourea might act in some other manner in the preservation of vitamin C.

While the invention has been more particularly described in connection with thiourea, it is to be understood that derivatives of thiourea may be employed and particularly those which are physiologically harmless such as the alkyl derivatives of which the methyl and ethyl derivatives are examples.

It may be that in certain instances the vitamin C content of foodstuffs may be more advantageously preserved by the use of a derivative than by thiourea itself.

Any desired quantity of thiourea may be added to a foodstuff or other substance to preserve its vitamin C content.

Therefore, while the amounts employed in the above examples form a guide they are not to be regarded as fixed.

This is because any addition of thiourea even though in relatively small percent will in a measure retard vitamin C deterioration.

On the other hand, relatively large quantities even though excessive will nevertheless be effective in the preservation of vitamin C.

The length of time that the vitamin C content of any substance is to be preserved will necessarily be taken into consideration in the selection of the desired or optimum quantities of thiourea to be employed.

Other conditions remaining the same, the optimum quantity might vary with the particular foodstuff and its state, that is, whether it is in the solid, semi-solid or liquid form.

By way of example, I have employed quantities of thiourea varying from 20% by weight to 500% by weight of the vitamin C content, and have found such quantities very effective in the stabilization of vitamin C.

Furthermore, while it is preferred to have the pH of the thiourea-foodstuff mixture below 7.0, there appears to be no particular limit to which the pH might decrease. This will, of course, be governed to a large extent by the fact that foodstuffs which are excessively acid are usually not desired for eating. The pH of citrus fruits which are consumed in large quantity might be employed as a guide.

The class of material and the quantity of solid matter present seems to influence to some extent the effectiveness of my stabilizing agent at any particular value of pH, so that it may be desirable to vary the pH in accordance with the material under treatment and its condition at the time of treatment.

Although I have particularly described my invention and set forth numerous examples, it is to be understood that this is by way of illustration and that changes, omissions, additions, substitutions and/or modifications might be made within the scope of the claims without departing from the spirit of the invention which is intended to be limited only as required by prior art.

I claim:

1. A process for the preservation of the vitamin C content of a liquid containing a significant quantity of vitamin C which comprises admixing said liquid with a substance selected from the class consisting of thiourea and methyl and ethyl derivatives of thiourea.

2. A process for the preservation of the vitamin C content of a liquid containing a significant quantity of vitamin C which comprises admixing said liquid with thiourea.

3. A process for the preservation of the vitamin C content of a liquid containing a significant quantity of vitamin C which comprises admixing said liquid with thiourea and maintaining the pH of the resulting mixture below 7.0.

4. A liquid containing a significant quantity of vitamin C and having admixed therewith as a vitamin C preservative a substance selected from the class consisting of thiourea and methyl and ethyl derivatives of thiourea.

5. An edible liquid containing a significant quantity of vitamin C and having thiourea admixed therewith as a vitamin C preservative.

6. An edible liquid extract containing a significant quantity of vitamin C and having thiourea admixed therewith as a vitamin C preservative.

7. An edible liquid extract of plant origin containing a significant quantity of vitamin C and having thiourea admixed therewith as a vitamin C preservative.

8. An edible liquid extract of animal origin containing a significant quantity of vitamin C and having thiourea admixed therewith as a vitamin C preservative.

9. A watery juice extracted from an edible plant material, said juice containing a significant quantity of vitamin C and having admixed therewith a vitamin C preserving substance selected from the class consisting of thiourea and methyl and ethyl derivatives of thiourea.

10. An extracted fruit juice containing a significant quantity of vitamin C and having thiourea admixed therewith as a vitamin C preservative.

11. Extracted orange juice in admixture with thiourea as a vitamin C preservative.

12. Extracted grapefruit juice in admixture with thiourea as a vitamin C preservative.

13. Extracted tomato juice in admixture with thiourea as a vitamin C preservative.

HEINRICH GOCKEL.